United States Patent [19]
Prosser et al.

[11] 3,980,979
[45] Sept. 14, 1976

[54] MAGNETICALLY OPERATED SWITCH UNIT

[75] Inventors: Paul E. Prosser, Hitchin; Alan F. J. Hookway, Slough, both of England

[73] Assignee: Bestobell Mobrey Limited, Slough, England

[22] Filed: Mar. 21, 1975

[21] Appl. No.: 560,709

[30] Foreign Application Priority Data
Mar. 25, 1974 United Kingdom............... 13127/74

[52] U.S. Cl. ............................... 335/188; 335/207; 200/67 F
[51] Int. Cl.² ......................................... H01H 5/00
[58] Field of Search ........... 335/188, 205, 206, 207; 200/67 F

[56] References Cited
UNITED STATES PATENTS

| | | | |
|---|---|---|---|
| 3,236,965 | 2/1966 | Bianco et al................... | 335/188 X |
| 3,447,110 | 5/1969 | Dotto............................... | 200/67 F |
| 3,449,700 | 6/1969 | Gillican............................ | 335/188 |

Primary Examiner—George Harris

[57] ABSTRACT

The invention relates to magnetically operated electric switches of the kind comprising a magnet which is pivotally mounted and is arranged to rock to and fro with a snap action under the influence of an adjacent relatively movable magnetic actuator, and at least one switch contact which is moved between two end positions relatively to one or more complementary switch contacts upon rocking of the magnet. The magnet is a bar magnet fixed in a pivoted carrier which forms one link of an over center spring toggle acting on a flexible leaf which carries the movable contact or contacts.

7 Claims, 3 Drawing Figures

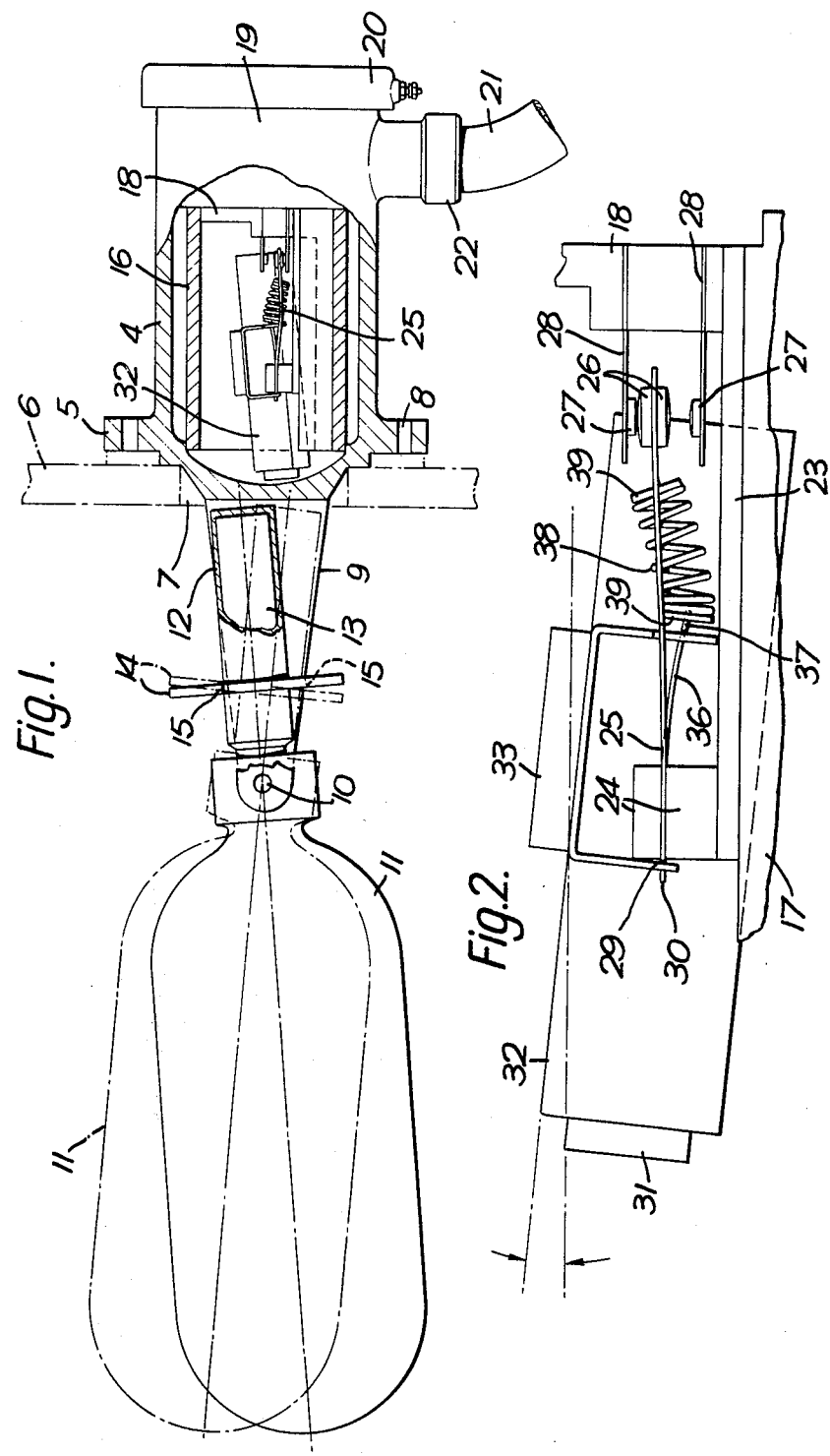

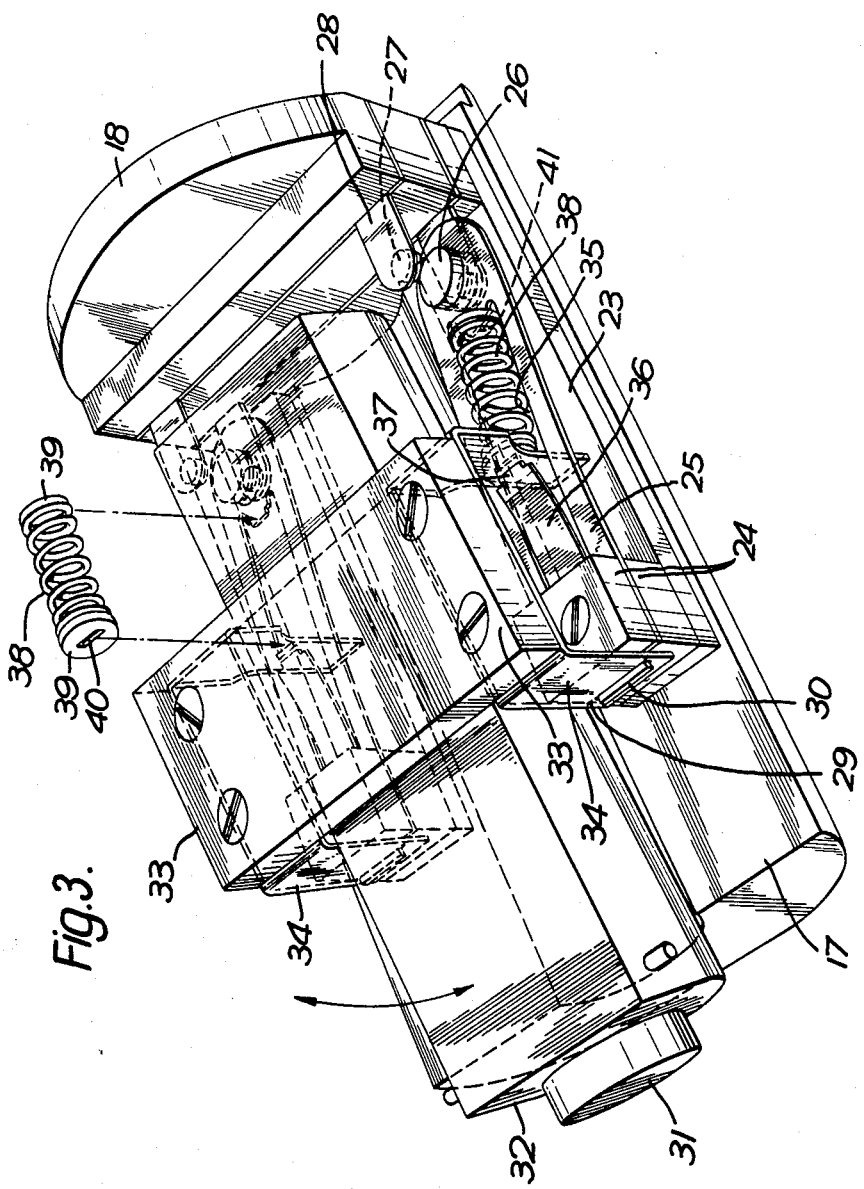

MAGNETICALLY OPERATED SWITCH UNIT

The invention relates to magnetically operated electric switches of the kind (hereinafter referred to as of the kind described) comprising a magnet which is pivotally mounted and is arranged to rock to and fro with a snap action uncer the influence of an adjacent relatively moveable magnetic actuator, and at least one switch contact which is moved between two end positions relatively to one or more complementary switch contacts upon rocking of the magnet.

The snap action changeover in the position of the magnet may be achieved in a number of conventional ways. For example if the magnet is a bar magnet pivoted about a transverse axis, the magnet actuator may be a second bar magnet mounted end to end with the switch magnet and pivoted about a transverse axis parallel to that of the switch magnet with adjacent end poles of the two bar magnets acting in repulsion. Alternatively, the magnetic actuator may incorporate two magnets or unmagnetised ferromagnetic armatures which move together to and fro so that one part captures the adjacent pole of the switch magnet and causes the switch magnet to swing to its other end position by magnetic attraction. Snap action exists because the force of attraction between the operative part of the magnetic actuator and the pole of the switch magnet increases as the parts moves towards one another. As a further possibility the switch magnet may be a bar magnet mounted on a transverse pivotal axis, the magnetic actuator being a second bar magnet which moves to and fro past the switch magnet along a line substantially parallel with the length of the bar magnetic actuator and substantially parallel to the pivotal axis of the switch magnet.

Such switches may form part of float operated switch assemblies in which the magnetic actuator follows the movement of a float which in turn follows the level of a liquid. The float chamber may be sealed from the operative parts of the switch by a non-magnetic wall through which the magnetic actuator influences the switch magnet. Other uses of such switches are as proximity switches or in revolution counters in which the magnetic actuator follows a rotatable part and operates the switch on each revolution.

The important design consideration in switches of the kind described are the need for minimum overall size, simplicity of construction and assembly, sensitivity of operation, high contact pressure between the switch contacts, and swift make and break of the contacts.

In one known design of switch the moving contact is carried directly by the switch magnet and the contact pressure is therefore directly related to the magnetic influence between the magnetic actuator and the switch magnet. This construction suffers the disadvantage that the magnetic influence varies as the magnetic actuator continues to move past the switching position and consequently the contact pressure will vary. Variations in the contact pressure will also occur if the switch assembly is subjected to vibration causing transient movement of the magnetic actuator or switch magnet. In an alternative construction the switch magnet operates on the button of a conventional microswitch. However, this construction requires a larger switch housing, involves additional tolerances which reduces the accuracy of the switch and requires an additional operating force between the magnetic actuator and switch magnet in order to depress the microswitch button against its own return spring pressure.

In accordance with the present invention, in a magnetically operated electrical switch of the kind described, the magnet is a bar magnet fixed in a carrier between two fixed supports by means of two mounting portions of the carrier which lie one on each side of the magnet and which cooperate with the supports to provide two coaxial fulcra about which the magnet is pivoted with the axis of the fulcra extending transversely to the magnet substantially through the centre of mass of the magnet and carrier, two flexible leaves extend one on each side of the magnet from the support and carry at their free ends at least one of the movable contacts, and at least one spring acts between the magnet carrier and the leaves adjacent to their other ends whereby the magnet carrier and the or each spring acts as one or more over centre spring toggles to cause the or each movable contact to snap over between its end positions as the magnet rocks to and fro.

A major advantage of the new switch is that the contact pressure is essentially constant being determined by the spring action on the movable switch contact and transient movements of the switch magnet do not affect the contact pressure. The electrical contact is made and broken quickly since it does not commence until the switch magnet is itself accelerating through its point of no return into its other end position.

The movable switch contact snaps over from one end position to the other when the line of action of the spring passes through the plane of the leaves upon rocking of the magnet. This leads to a particularly compact construction and may be likened to the switch magnet forming directly the operating part of a microswitch. However the disadvantage of overcoming the return spring loading of the button of a conventional microswitch is avoided, and the introduction of tolerances between the mounting of the microswitch and that of the switch magnet are eliminated as a result of the magnet and leaves being mounted on a common support.

The tolerances are reduced still further if the fulcra are provided by direct engagement between parts of the mounting portions of the carrier and complementary parts of the flexible leaves. This could be provided by a knife edge formed on each flexible leaf in conjunction for example with a tongue which is received in a slot in the mounting portions of the magnet carrier. With this type of construction there is no backlash as in a conventional bearing pivot and reduced friction between the relatively moving parts.

As the contact pressure is determined essentially by the toggle spring acting between the magnet carrier and flexible leaves, the contact pressure and the switch memory is independent of the magnetic influence required to change the switch magnet over from one end position to the other. This leads to the possibility of improving the sensitivity of the switch and hence enabling for example a smaller float to be used in a float switch assembly, or an inferior magnetic coupling between the magnetic actuator and switch magnet be acceptable. This reduction in the torque necessary to change over the switch magnet may be achieved by providing a mechanical, magnetic, or other means continually urging the magnet and carrier to rock to an intermediate position. An appropriate mechanical influence may be provided for example by a spring or springs, such as spring tongue formed integrally with the flexible leaves when the flexible leaves are formed as leaf springs. An appropriate magnetic influence may be provided in a number of ways. For example, a magnet with an adjacent pole of opposite polarity or an unmagnetised ferromagnetic slug may be fixed symmetrically beyond the non-operated end of the switch magnet to attract that end of the switch magnet towards the central position. Alternatively two magnets may be mounted one at each end of the arc of movement of the non-operative end of the switch magnet with their poles adjacent to the switch magnet of similar polarity to that at the non-operative end of the switch magnet in order that they mutually repulse the adjacent end of the switch magnet and urge it to adopt a central position.

The links of the spring toggle may be arranged end to end so that the angle at their central knee joint is obtuse. In that case, the spring will be a compression spring. This construction is simpler mechanically although it is equally possible for the spring toggle to be of the inverted form in which the angle at its central knee joint is an acute angle. In that case the spring will be a tension spring.

An example of a switch constructed in accordance with the invention is illustrated in the accompanying drawings, in which:

FIG. 1 is a side elevation of the switch with parts broken away in section;

FIG. 2 is a side elevation of part of the switch mechanism; and,

FIG. 3 is a perspective partly exploded view of the moving parts of the dry side of the switch.

The illustrated switch has an aluminium bronze housing 4 which houses the dry side of the switch and which is formed integrally with a flange 5. The flange 5 is arranged to be bolted to a container wall 6 around an aperture 7 by means of bolts passing through holes 8. A gasket is interposed between the flange 5 and wall 6.

On the wet side of the switch, that is within the container, two ears 9 project from the flange 5 through the opening 7 and support the ends of a pin 10 which provides a pivotal mounting for a float 11 and a stainless steel shell 12 which houses a bar magnet 13. The pivotal movement of the float assembly is limited by a flange 14 which is fixed to the shell 12 and has shoulders 15 which engage the ears 9.

Within the housing 4 there is secured an inner electrically insulating housing 16 made of a mica glass or ceramic material for example of the kind sold under the trade name Mycalex in the case of a mica glass.

The housing 16 contains a ceramic base 17 and wall 18 which provides an insulating barrier between the moving parts of the switch within the housing 16 and a compartment 19 within the end of the outer housing 4, which contains electrical terminals. The terminals are accessible through an end cover 20 and have secured to them the conducting cores of a cable 21 which enters the housing through a gland 22.

A pair of rigid conductors 23 extend through the wall 18 on the base 17 and a pair of metal blocks 24 are screwed or riveted to the end of each conductor 23 with the end of a metal leaf spring 25 clamped between them. Each leaf spring 25 carries at its free end on each surface a moving contact 26 which cooperates with a complementary fixed contact 27 carried by a fixed conductor 28 passing through the wall 18. The conductors 23 and 28 will be connected to the terminals within the terminal box 19. The main current path through each pair of switch contacts is through the conductor 23, block 24, leaf 25, contacts 26 and 27, and conductor 28. The four pairs of complementary contacts may be connected electrically in different circuits.

The clamped end of each leaf 25 is provided with a knife edge 29 from which projects a tongue 30. The two knife edges 29 are colinear and provide a fulcrum for a switch magnet assembly. The switch magnet assembly consists of a bar magnet 31 fixed in an insulating ceramic carrier casing 32 formed with a transverse portion terminating in lugs 33. Each lug has screwed or riveted to it a channel shaped metallic bracket 34 one arm of which bears against the corresponding knife edge 29 with the tongue 30 extending loosely through a hole in the arm for location purposes. The axis of the fulcrum provided by the knife edges 29 extends transversely substantially through the centre of mass of the magnet 31 and carrier 32.

Each of the leaf springs 25 is formed along the central portion of its length with a slot 35. Within part of this slot is a spring tongue 36 which is integrally joined with the material of the corresponding leaf spring 25 at its clamped end. The free end of the tongue 36 is formed with the smaller locating tongue 37 which extends through a complementary slot in the other arm of the corresponding bracket 34. The other part of each slot 35 accommodates a helically coiled compression spring 38 fitted at its ends with discs 39 each formed with a central slot 40. At one end the spring 38 is located by the tongue 37 which projects far enough to enter the slot 40 in the spring end disc and at its other end by a similar tongue 41 formed integrally with the leaf spring 25 and extending into the other spring disc slot. This construction provides, at each side of the switch magnet assembly, an over centre spring toggle the links of which are provided by one of the brackets 34 and the adjacent compression spring 38.

The adjacent ends of the magnet 13 and 31 have the same polarity so that they repel one another. Thus in the positions illustrated in FIGS. 1 and 3, the float 11 is in a lowermost position and the switch magnet assembly consisting of the magnet 31 and carrier 32 is in a limiting anti-clockwise position with the free ends of the leaves 25, and the moving contacts 26 in their lowermost positions, under the downward component of the reactions of the springs 38. When the liquid level in the vessel rises, the float 11 rises with it, and as the float approaches the chain dotted line position in FIG. 1, the end of the magnet 13 passes the end of the magnet 31. As this occurs the magnetic influence acting through the non-magnetic end wall of the housing 4 acts in the opposite direction on the switch magnet assembly which rocks with a snap action to its clockwise limiting position as seen in FIG. 2. As the assembly rocks through a dead centre position, the adjacent arms of the brackets 34 carry the tongues 37 and hence the adjacent ends of the compression springs 38 downwards through the plane of the leaves 25 so that the springs 38 suddenly apply an upward reaction on the free ends of the leaves 25 causing the free ends of the leaves 25 and the moving contacts 26 to snap over to their raised positions. When the liquid level falls subsequently the reverse operation occurs and the spring toggles change over in the opposite sense.

It would be appreciated that transient movements of the switch magnet assembly do not affect the contact pressure which is determined by the substantially constant reaction from the springs 38.

A further advantage of the illustrated construction, which may not be immediately apparent is that the spring tongues 36 operate independently of the position of the leaf springs 25 and when displaced from their central position in either sense tend always to urge the switch magnet assembly to its central equilibrium position. The magnetic actuation between the magnets 13 and 31 does not therefore have to overcome the full component of the reactions of the springs 38 in order to change over the switch, but only the difference between the reactions from the springs 38 and those from the spring tongues 36. This reduction in the working reaction does not however affect the contact pressure.

Many modifications are possible. For example only one fixed contact 27 need be provided for cooperation with the single moving contact 26 at the end of each leaf 25. Alternatively, the free ends of the leaves 25 may be integrally united between the end of the switch magnet assembly and the wall 18 and carry, in alignment with the central axis of the switch magnet assembly, a single moving contact or pair of moving contacts 26. In this modification it is also possible to dispense with two spring toggles and to provide a single spring toggle by interposing a compression spring between the end of the magnet carrier 32 and the connecting portion between the free ends of the leaves 25.

We claim:

1. A magnetically operated electrical switch of the kind comprising of a magnetic actuator, a switch magnet which is pivotally mounted and adapted to rock to and fro with a snap action under the influence of said magnetic actuator, at least one switch contact which is moved between two end positions relative to at least one complementary switch contact upon rocking of said magnet, wherein said magnet is a bar magnet fixed in a carrier between two fixed supports by means of two mounting portions of said carrier lying one on each side of said magnet and cooperating with said supports to provide two coaxial fulcra about which said magnet is pivoted, with the axis of said fulcra extending transversely to said magnet, two flexible leaves extend one on each side of said magnet from said support and carry at the free ends thereof at least one of said movable contacts, and at least one spring acts between said magnet carrier and said leaves adjacent to the other ends thereof whereby said magnet carrier and said at least one spring act as at least one over center spring toggle to cause said at least one movable contact to snap over between the end positions thereof as said magnet rocks to and fro.

2. A switch according to claim 1, wherein said spring is a compression spring.

3. A switch according to claim 1, wherein said fulcra are provided by direct engagement between parts of said mounting portions of said carrier and complementary fixed parts of said flexible leaves.

4. A switch according to claim 1, wherein said flexible leaves are leaf springs.

5. A switch according to claim 1, including means continually urging said magnet and carrier to rock to an intermediate position.

6. A switch according to claim 1, wherein said flexible leaves are leaf springs, and said magnet and carrier are continually urged to rock to an intermediate position by spring tongues formed integrally with said leaf springs.

7. A switch according to claim 1, wherein the axis of said fulcra extends substantially through the center of mass of said magnet and carrier.

* * * * *